June 14, 1966　　　M. O. LLOYD　　　3,255,769
PROTECTIVE HOUSING
Filed Jan. 23, 1964　　　3 Sheets-Sheet 1
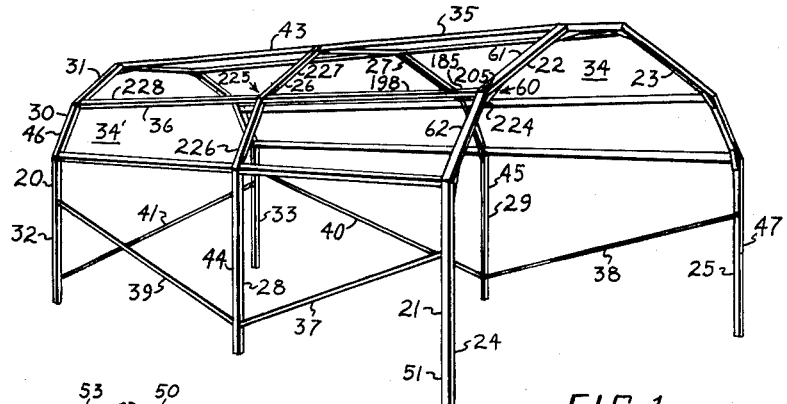
FIG.1.
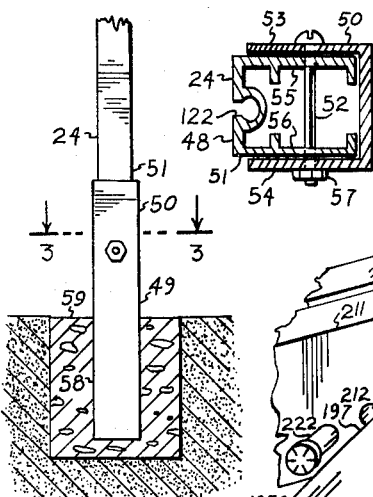
FIG.2.
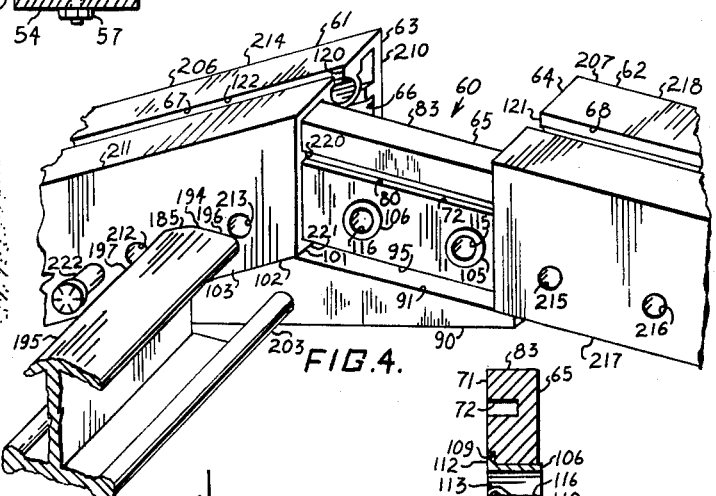
FIG.3.
FIG.4.
FIG.6.
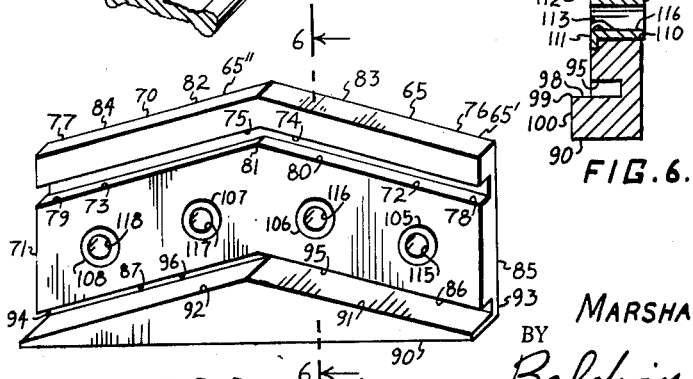
FIG.5.
INVENTOR.
MARSHALL O. LLOYD
BY
Baldwin & Martin
ATTORNEYS

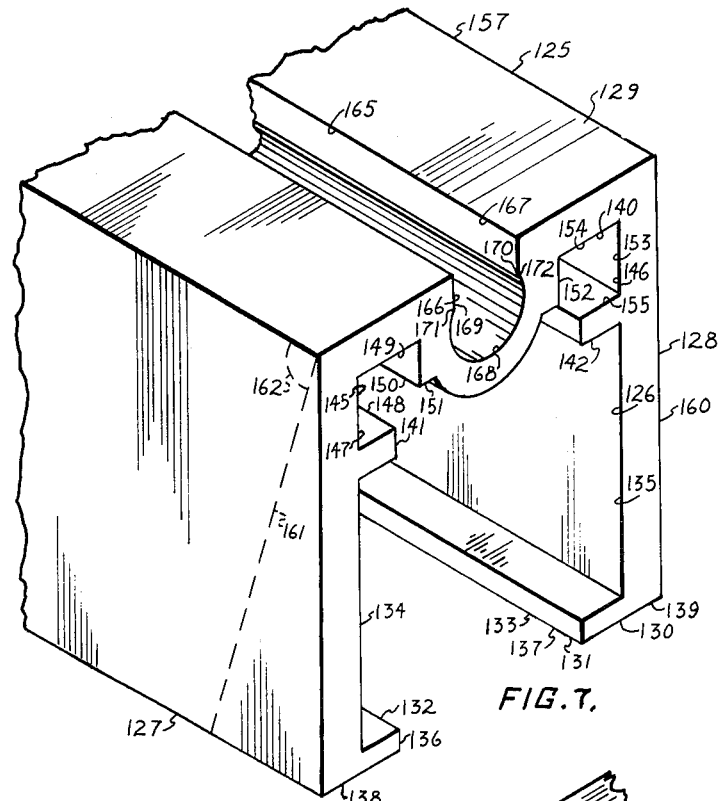

June 14, 1966 M. O. LLOYD 3,255,769
PROTECTIVE HOUSING
Filed Jan. 23, 1964 3 Sheets-Sheet 3

INVENTOR.
MARSHALL O. LLOYD
BY
Baldwin & Martin
ATTORNEYS

United States Patent Office

3,255,769
Patented June 14, 1966

3,255,769
PROTECTIVE HOUSING
Marshall O. Lloyd, 4703 King Richard Road,
Jacksonville, Fla.
Filed Jan. 23, 1964, Ser. No. 339,677
13 Claims. (Cl. 135—3)

This invention relates to protective housings and more particularly concerns the frame and structural components of such protective housings.

A general object of the present invention is to provide an improved frame for a protective housing.

Another general object of this invention is the provision of an improved mitered joint assembly for connecting structural components of the protective housing frame.

A particular object of the invention is to provide a frame which may be readily assembled with minimum of effort and tools.

Another particular object is the provision of a prefabricated frame disassembled for shipment and erectable by unskilled labor with a minimum number of nuts and bolts.

A specific object is the provision of an improved extruded rib structural component, for use particularly in the arch of the frame, which is light in weight yet rigid and durable in use.

Another specific object is to provide an improved spacer structural component, for use particularly between adjacent arches of the frame, which is also light in weight and rigid and durable in use.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIGURE 1 is a perspective view of the frame of a protective housing constructed in accordance with the invention;

FIGURE 2 is a side elevational view of one of the upstanding posts supported at its lower end portion by the ground;

FIGURE 3 is a horizontal cross section view on an enlarged scale taken along line 3—3 of FIGURE 2;

FIGURE 4 is an isometric view on an enlarged scale of one of the mitered joint assemblies connecting components of the frame of FIGURE 1, partially exploded to illustrate details thereof;

FIGURE 5 is an isometric view on an enlarged scale of the coupling member in accord with the invention;

FIGURE 6 is a vertical cross section taken along line 6—6 of FIGURE 5;

FIGURE 7 is an isometric view on an enlarged scale of one of the extruded rib structural components which form the upstanding posts and arches in the frame of FIGURE 1;

FIGURE 8 is an isometric view on an enlarged scale of one of the extruded spacer structural components which form the longitudinal connectors between adjacent arches of the frame of FIGURE 1;

FIGURE 9 is a cross sectional view of the resilient member for attaching a sheet material cover to the frame of FIGURE 1;

Figure 10:
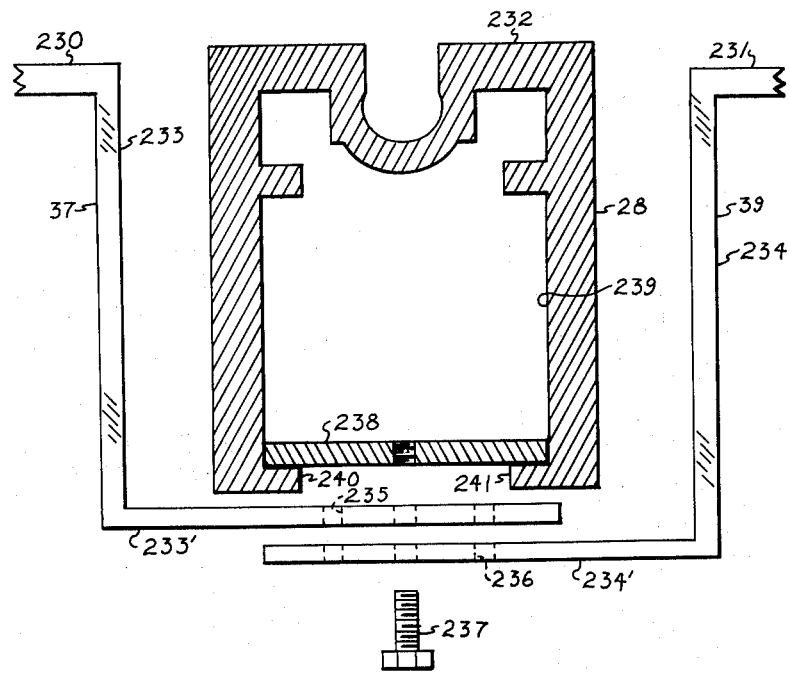
FIGURE 10 is an exploded transverse sectional view of one of the vertical posts showing the details of connecting the side cross braces thereto.
Figures 11, 12:
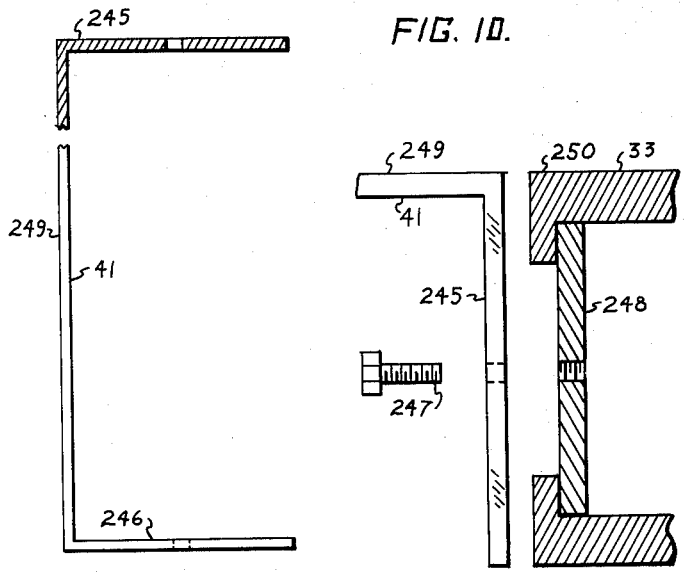
FIGURE 11 is an exploded transverse cross sectional view of one of the vertical posts showing the details of connecting the end cross braces thereto.
FIGURE 12 is a side elevational view of the end cross brace partly in section.

Referring now more particularly to the drawings, the frame 20 of the tent or arcade structure is depicted in FIGURE 1, and includes upstanding extruded rib structural components or members in the form of rectangular boxes, collectively designated at 21, constituting ground engaging support posts therefor. Frame 20 also includes rectilinear extruded rib members 22 connected end to end and forming arch 23 which spans between respective posts 24 and 25. Similarly, rib members 26 form arch 27 between posts 28 and 29; and rib members 30 form arch 31 between posts 32 and 33. A plurality of extruded spacer structural components or members, collectively designated at 35, connectively span between the arches 23 and 27, and a plurality of spacer members 36 similarly span between arches 27 and 31. Side cross braces 37 and 38 are respectively connected to upstanding posts 24 and 28 and posts 25 and 29, and respective side cross braces 39 and 40 are similarly connected to posts 28 and 32 and posts 29 and 33. An end cross brace 41 is connected to posts 32 and 33, thereby completing the rigidized frame 20. The covering for the frame 20 and its attachment thereto will be more fully described after the specific descriptions of the various components of frame 20 are considered in connection with FIGURES 2 to 9, hereinbelow.

As seen in FIGURES 2 and 3, frame 20 is provided with a channel 49 having an upper end portion 50 telescoped over lower end portion 51 of post 24, attachment therebetween being accomplished by a headed bolt 52 inserted through side channel walls 53 and 54 and side posts walls 55 and 56 and nut 57 threaded thereon. The lower end portion 58 of channel 49 is shown imbeded within poured concrete 59, it being understood that connection and/or support on a foundation or the ground may be desired. The other posts 25, 28, 29, 32 and 33 are supported on the ground in the same manner as post 24, hereinabove described.

The mitered joint assembly in accordance with the invention is designated generally at 60 in FIGURES 1 and 4, and includes a pair of elongated rectilinear hollow box rib members 61 and 62 forming a portion of arch 23. Means for connecting the abutting slanted ends 63 and 64 of respective rib members 61 and 62 comprises at least one elongated V-shaped coupling member 65 having a pair of legs 65' and 65" respectively disposed in nesting relation within hollow 66 of rib member 61 and a similar hollow (not shown) of rib member 64. The joint assembly 60 will be more clearly understood after the description of the coupling member 65 shown specifically in FIGURES 5 and 6, the rib member 125 shown in FIGURE 7, and the spacer member 135 shown in FIGURE 8.

The term mitered joint is used herein to extend to any joint formed by a pair of members having slanted ends abutting to form a predetermined angle therebetween, regardless of whether the abutting plane between the ends bisects such angle.

Coupling member 65 includes an elongated body element 70 having a planar front surface 71, surface 71 being interrupted by a pair of channel grooves 72 and 73 which communicate at their respective ends 74 and 75 generally midway between body end portions 76 and 77. The downwardly directed opposite groove ends 78 and 79 open outwardly of the body element 70 at the respective end portions 76 and 77 thereby providing a continuous inverted V-shaped passageway 80 extending along body element 70 between its end portions 76 and 77. As seen in FIGURE 5, grooves 72 and 73 communicate at their upper ends 74 and 75 at a predetermined included angle 81, as measured within body element 70, the predetermined angle 81 being specifically shown as being 150°. The upper inverted V-shaped edge portion 82 of body element 70 is formed by a pair of planar surfaces 83 and 84 meeting at an included angle, as measured within body element 70, substantially equal to the predetermined angle 81 between grooves 72 and 73. The lower edge portion 85 is also formed of a pair of planar surfaces 86 and 87 meeting at an excluded angle, as measured externally of body element 70, substantially equal to angle 81. Body element 70 is provided with a bottom cover portion 90 having a pair of planar surfaces 91 and 92 spaced from and substantially parallel to respective surfaces 86 and 87, surfaces 91 and 92 meeting at an included angle substantially equal to angle 81. Body element 70 includes connecting portions 93 and 94 which respectively span between surfaces 86 and 91, and surfaces 87 and 92. Connecting portion 93 and surfaces 86 and 91 constitute a groove 95 which is substantially parallel to groove 72, while connecting portion 94 and surfaces 87 and 92 constitute a groove 96 substantially parallel to groove 73. Grooves 95 and 96 meet midway between body end portions 76 and 77 identical to grooves 72 and 73 hereinabove described. Cover portion 90 extends forwardly of the planar front surface 71, as shown in FIGURE 6, and the extension 98 partially covers the lower adjacent flanges of abutted rib members 61 and 62, the only flange shown in FIGURE 4. Extension edge 99 is substantially directly below edge 102 of rib member 61 whereby the upstanding extension face 100 is flush with rib member upstanding outer face 103.

Locking means in the form of a pair of hollow tubular clips 105 and 106 are inserted through openings, including opening 110, which extend through body 70 of coupling member 65 spacedly between grooves 72 and 95, similar tubular clips 107 and 108 being provided in openings (not shown) between grooves 73 and 96. Opening 110 is countersunk and provided with countersunk shoulder 109, and tubular clip 106 is inserted into opening 110 with clip flange 111 engaging countersunk shoulder 109 whereby the clip top surface 112 is flush with or positioned inwardly of the body front surface 71. Clip 106 includes a plurality of inwardly directed resilient fingers, including finger 113, which forcibly engages a headed fastener or pin inserted therein, as hereinafter more fully described.

The extruded elongated rectilinear rib members, including members 61 and 62, in accord with the invention will be described in detail by reference to FIGURE 7, wherein rib member 125 is generally in the shape of a rectangular box member having a hollow 126 therein. Member 125 includes a pair of upstanding side walls 127 and 128, a top wall 129, and a bottom wall 130, wall 130 being interrupted by an elongated slot 131. A pair of oppositely facing flanges 132 and 133 extend inwardly of respective inner side wall planar surfaces 134 and 135, and the flange ends 136 and 137 define the elongated slot 131. Flanges 132 and 133, together with side wall lower ends 138 and 139, constitute the bottom wall 130 of rib member 125. Spaced upwardly from flanges 132 and 133 below the lower surface 140 of top wall 129 is a pair of oppositely facing upper flanges 141 and 142 extending inwardly of respective inner planar surfaces 134 and 135 into hollow 126, flange 141 being substantially parallel to lower flange 132 and flange 142 being substantially parallel to lower flange 133.

Elongated passageways 145 and 146 are provided in rib member 125, passageway 145 being adjacent side wall 127 and including upstanding inner side wall surface portion 147, horizontal flange upper surface 148, horizontal lower top wall surface portion 149 and vertical flange surface 150, flange surface 150 being substantially parallel to surface portion 147. Flange 151 extends inwardly from top wall 129 and a similar flange 152 is provided adjacently spaced from and substantially parallel to surface portion 153 of inner side wall surface 135. The other elongated passageway 146 is adjacent side wall 128 and includes horizontal top wall surface portion 154, horizontal flange upper surface 155, upstanding surface portion 153 and upstanding flange surface 156.

The interfitting relationship of the coupling members with the rib members may, for example, be understood by reference to FIGURES 5 and 7, wherein coupling member 65 is constructed to be slidingly disposed within rib member hollow 126 with the spaced flanges 141 and 132 respectively within grooves 73 and 96. Part of the upper edge portion 82 of coupling member 65 would then be nested within passageway 145 while the cover extension 98 would be coextensive with flange 132 and wall end portion 138.

Rib member 125, as shown in FIGURE 7, has a planar flat end 160 which is adaptable for use, as the vertical post 24 having a lower end portion 51 depicted in FIGURES 1, 2 and 3. When the rib member 125 is to be provided with a slanted abutting end to be used in the mitered joint assembly 60 of FIGURE 4, the rib member is cut by a saw on a slant so that the top wall 129 extends a greater distance than the bottom wall 130, the broken line 161 indicating the abutting slanted end of member 125 which is identical to slanted end 63 of rib member 61 in FIGURE 4. The angle, as indicated by broken line 162, between the top wall 129 and the slanted end 161 is substantially equal to one-half of the predetermined included angle 81 of FIGURE 5.

The top wall 129 of rib member 125 includes an elongated socket 165 extending from end to end of rib member 125, socket 165 including oppositely facing and spaced side walls 166 and 167 extending downwardly below the upper surface 157 of top wall 129, and a bottom wall 168 extending outwardly from the lower ends 169 and 170 of respective side walls 166 and 167 thereby providing stop means or shoulders 171 and 172.

The plastic or canvas covering (not shown) for the tent frame 20 may best be described in connection with rib member 125 and the resilient member 175 depicted in FIGURE 9, wherein member 175 may, for example, be an extruded vinyl or other similar material. Member 175 includes a planar top portion 176, an intermediate corrugated shank portion 177 and a bulbar bottom portion 178. With the covering lying over top wall 129 of rib member 125, the resilient member 175 is placed over the covering with the bulbar portion 178 engaging the covering over the socket 165; thereafter the bulbar portion is forced downwardly between socket side walls 166 and 167 until bulbar portion 178 is adjacent socket bottom wall 168 with shoulders 171 and 172 disposed over respective outwardly extending bulbar upper portions 179 and 180. The covering is gripped between shank portion 179 and the socket side walls 166 and 167 and between bulbar portion 178 and socket bottom wall 168, shoulders 171 and 172 stopping the resilient member 175 from inadvertent removal from socket 165.

The extruded elongated rectilinear spacer member 185 in accord with the invention is depicted in FIGURE 8 and includes a planar base portion 186 having a corrugated reinforcing lower surface 187 and a pair of elongated side edges 188 and 189 which are in the form of a rod having a diameter slightly greater than the thickness of the planar base portion 186. An elongated upstanding wall portion 190 is attached to the base portion 186 at its lower end 191 spaced substantially equidistantly between side edges 188 and 189. The spacer top portion 193 is attached to the wall portion upper end 192 and includes a pair of laterally extending legs 194 and 195, wall portion 190 and top portion 193 forming a T-shaped configuration therefor. Legs 194 and 195 have respective substantially planar upper surfaces 196 and 197 which are angularly disposed to meet at a round 198, the angle between the leg surfaces 196 and 197 being substantially equal to the predetermined included angle 81 in FIGURE 5.

One end portion 200 of extruded spacer member 185 is substantially removed or cut out as at 201, wherein parts of the base portion 186, wall portion 190 and top portion 193 are cut away to form an upstanding abutting end 202 and a pair of spaced pins 203 and 204 which are continuations of rod like side edges 188 and 189. Pins 203 and 204 are adapted and arranged to extend through an opening in each of the abutting rib members 61 and 62, as more fully described hereinbelow.

Referring again to the mitered joint assembly 60 depicted in FIGURE 4, joint assembly 60 comprises the pair of rib members 61 and 62, the coupling member 63 and the spacer member 185, it being understood that another coupling member 224, identical to member 65, is provided nestingly disposed within hollow 66 of rib member 61 adjacent its side wall 210. Spaced apertures 212 and 213 extend through side wall 211 at predetermined positions to register with respective tubular clip openings 118 and 117 when rib end portion 214 is slidably positioned fully seated on coupling member 65, as shown in FIGURE 4. Apertures 215 and 216 extend through side wall 217 of rib member 62, apertures 215 and 216 registering with respective tubular clip openings 116 and 115 when rib end portion 218 is slidably positioned fully seated on coupling member 65 with slanted ends 63 and 64 in abutment. The upper inwardly directed flange 220 is nested within channel groove 73 and the lower flange 221 is nested within channel groove 96 of coupling member 65. Similar upper and lower flanges (not shown) of rib member 62 are adapted to nest within respective coupling member grooves 72 and 95.

With rib members 61 and 62 fully seated on coupling member 65, slanted ends 63 and 64 abut, and the apertures 212 and 213 register with respective openings 118 and 117, and apertures 215 and 216 register with respective openings 116 and 115. Means for attaching each of the rib members 61 and 62 to the coupling member 75 comprises spacer member 185. Pins 203 and 204 are spaced apart a predetermined distance substantially equal to the distance between tubular clip openings 116 and 117. Pins 203 and 204 extend through respective rib member apertures 215 and 213, and the pins 203 and 204 are of a predetermined diameter slightly less than tubular clip openings 116 and 117 so that they are tightly fitted and retained within respective tubular clips 106 and 107 by resilient fingers, including finger 113, thereby locking the mitered joint assembly 60. The upstanding end wall 202 abuts against the upstanding side walls 103 and 217 of respective rib members 61 and 62 when pins 203 and 204 extend therethrough thereby providing a rigid lateral abutment for rib members 61 and 62. A pair of headed fastening elements, including elements 222, extend through respective rib member openings 212 and 216 and fit tightly within tubular clip openings 118 and 115 further rigidly attaching each rib member 61 and 62 to coupling member 65.

The mitered joint 60, as shown in FIGURES 1 and 4, includes rib members 61 and 62, coupling member 65, spacer member 185, a pair of headed fastening elements, including element 222, and four tubular clips 105, 106, 107 and 108. Joint 60 further includes another coupling member 224, an inner and an outer pair of headed fastening elements (not shown), and four tubular clips (not shown), coupling member 224, fastening elements and tubular clips respectively being identical to coupling member 65, fastening element 222 and tubular clip 106. The mitered joint, indicated generally at 225, is substantially identical to mitered joint 60, with the exception that spacer member 228 provides a pair of pins (not shown) which extend through openings (not shown) in rib members 226 and 227 rather than the inner pair of fastening elements which connect coupling member 224 to rib members 61 and 62, as hereinabove described.

With mitered joint 60 fully assembled, the rib members 61 and 62 make an angle therebetween equal to the predetermined angle 81 of coupling member 65. The socket portions 67 and 68 of respective rib members 61 and 62 communicate at their abutting ends 120 and 121 thereby forming a continuing socket channel 122, shown in FIGURES 3 and 4, which extends along the outwardly disposed face (not shown) of upstanding post 25, the outwardly disposed faces or top walls of rib members 22, identical to top wall 129 of rib member 125 shown in FIGURE 7, and the outwardly disposed face 48 of upstanding post 24. The plastic or canvas covering for the tent or arcade frame 20 may extend over only the arch portion 43, or partially or completely down the side portions 44 and 45. The tent frame covering is forced into socket channel 122 of arch 23 and, for example, partially down posts 24 and 25 and secured thereto by an elongated extruded vinyl member, identical to member 175 of FIGURE 9; the covering is stretched toward arch 27 and another vinyl member forcibly retains the cover within channel socket, identical to channel socket 122, which extends along arch 27 and posts 28 and 29; and the covering is similarly secured to arch 31 and posts 32 and 33. The covering, as described, overlies the arches 23, 27 and 31 forming the top, and partially extends over the upper portions of the upstanding posts forming a flap or skirt, it being contemplated that the covering may extend further down the posts thereby covering side portions 44 and 45 of frame 20.

A border of a semi-circular shaped sheet material (not shown), substantially identical to but larger than the arch opening 34, is inserted into socket channel 122 with the top covering and properly maintained in position by the elongated vinyl extrusion therewithin, the semi-circular material thereby covering arch opening 34. A similar semi-circular sheet material or a rectangular sheet material having a semi-circular shaped upper portion may be provided for the back end opening, indicated at 34', formed by and between arch 31 and posts 32 and 33. A removable door flap may be provided, for example, at the front portion 47 below arch opening 34, which includes a plurality of common twist fasteners spacedly attached to post 24 and 25, and a sheet of plastic or canvas having spaced grommets for registering with the respective twist fasteners.

The upper mitered joint edge 205, formed between rib members 61 and 62 with the respective upper surfaces 206 and 207 extending outwardly substantially at the predetermined angle 81 of coupling member 65, is substantially in alignment with the elongated round 198 of spacer member 185 and the upper surfaces 196 and 197 of legs 194 and 195 are respectively coplanar with upper surfaces 206 and 207 of rib members 61 and 62, whereby legs 194 and 195 of spacer member 185 provide support for the frame covering together with proper spacing and rigidizing between the arches of frame 28.

The elongated side cross braces 37 and 39 include respective front faces 230 and 231 which are flush with outwardly disposed face 232 and post 28, when attached as described below, to provide backing support for the covering when such covering extends sufficiently below the braces, and the L-shaped flanged end portions 233 and 234 extend rearwardly of post 28 for adjustable attachment thereto. A plurality of spaced openings 235 and 236 are provided in respective ends 233' and 234', and a threaded bolt 237 is inserted through preselected aligned openings 235 and 236, and threaded into a backing plate 238 positioned within hollow 239 of post 28, plate 238 engaging flanges 240 and 241 when brace ends 233' and 234' are connected between bolt head 242 and backing plate 238.

The elongated end cross brace 41 includes flange end portions 245 and 246 which are respectively attached rearwardly of posts 33 and 32, bolt 247 and backing plate 248 attaching flange 245 to post 33. The front face of end brace 41 is flush with rearward side wall 250 of post 33 to provide a backing support for an end covering material when such covering material extends therebelow.

The tent frame 20 as depicted in FIGURE 1, is formed of three arches, each containing five rib members mitered end to end with the arch free ends mitered to a pair of vertical rib posts. Each of the mitered joints are at an included angle of 150° resulting in a flat rib member at the top of the arch. If a pointed top were desired, the flat rib members of the arches may be omitted and the rib posts would then be slanted inwardly at 30° from the vertical. If one desired to maintain the posts vertical, for example, and to use four rib members in each arch, the included mitered angle would then be selected to be 144° resulting in a pointed top for the tent frame.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A mitered joint assembly comprising a pair of elongated hollow box members having a top wall and a bottom wall and a pair of side walls, each said box member having a slanted open end extending from its said top wall to its bottom wall at a predetermined angle less than 90°, an elongated coupling member having a pair of legs extending outwardly at an included angle substantially twice said predetermined angle, each said leg being inserted into a respective said slanted open end, said slanted open ends of said box members being in abutment, said coupling member having a pair of spaced openings therethrough, one said side wall of each said box member having an aperture therethrough adjacent its said slanted open end, each said aperture being in registry with respective said opening when said slanted open ends are in abutment with said coupling member disposed in each said slanted open end, connecting means for attaching each said box member to said coupling member, said connecting means including an elongated spacer member having a pair of spaced pins extending from one of its ends, said pins being inserted through said registered apertures and openings, and locking means within said box members for maintaining said pins within said box member apertures and said coupling member openings.

2. A mitered joint assembly comprising a pair of elongated hollow rectangular box members having a top wall and a bottom wall and a pair of side walls, each said box member having a slanted open end extending from its said top wall to its bottom wall at a predetermined angle less than 90°, an elongated coupling member having a pair of legs extending outwardly at an included angle substantially twice said predetermined angle, each said leg being inserted into a respective said slanted open end, said slanted open ends of said box members being in abutment, said coupling member having a pair of spaced openings therethrough, one said side wall of each said box member having an aperture therethrough adjacent its said slanted open end, each said aperture being in registry with respective said opening when said slanted open ends are in abutment with said coupling member disposed in each said slanted open end, connecting means for attaching each said box member to said coupling member, said connecting means including an elongated spacer member having a pair of spaced pins extending from one of its ends, said pins being inserted through said registered apertures and openings, and locking means for maintaining said pins within said box member apertures and said coupling member openings, said spacer member further including a top wall, said spacer member top wall being formed of a pair of legs extending outwardly at another included angle substantially equal to said included angle, said top wall of one said box member being substantially coplanar with one said leg of said spacer member top wall, and said top wall of the other said box member being substantially coplanar with the other said leg of said spacer member top wall.

3. A mitered joint assembly comprising a pair of elongated hollow rectangular box members having a top wall and a bottom wall and a pair of side walls, each said box member having a slanted open end extending from its top wall to its lower wall at a predetermined angle less than 90°, a pair of elongated coupling members each having a pair of legs extending outwardly at an included angle substantially twice said predetermined angle, one said leg of each said coupling member being inserted into one said slanted open end, the other said leg of each said coupling member being inserted into the other said slanted open end, said open slanted ends of said box members being in abutment, each said coupling members having a pair of spaced openings therethrough, each said box member having a respective aperture through each of its said side walls adjacent its said slanted open end, one of said apertures of each said box member being in registry with a respective said opening of one said coupling member when said slanted open ends are in abutment with said one coupling member disposed in each of said open slanted ends, the other of said aperture of each said box member being in registry with respective said openings of the other said coupling member when said slanted open ends are in abutment with said other coupling member disposed in each of said open slanted ends, and connecting means extending through said registered apertures and openings for attaching each said box member to each said coupling member, said connecting means including a pair of elongated spacer members respectively having a pair of spaced pins extending from one of its ends, one said spacer member being disposed with its said pins spanning between adjacent ones of said side walls of respective said abutted box members and respectively aligned and inserted through said apertures in said ones of said side walls and respectively through said registering openings in said one coupling member, locking means for maintaining said pins of said one spacer member locked to said one coupling member, the other said spacer member being disposed with its said pins spanning between adjacent others of said sidewalls of respective said abutted box members and respectively aligned and inserted through said apertures in said others of said side walls and respectively through said registering openings in said other coupling member, and other locking means for maintaining said pins of said other spacer member locked to said other coupling member.

4. A mitered joint assembly comprising a pair of elongated hollow rectangular box members having a top wall and a bottom wall and a pair of side walls, each said box member having a slanted open end extending from its top wall to its lower wall at a predetermined angle less than 90°, each said box member having a flange extending inwardly into said hollow from each of its said side wall, a pair of elongated coupling members each having a pair of elongated grooves communicating at one end thereof and extending outwardly to the ends of each said coupling member at an included angle substantially twice said predetermined angle, one said end of each said coupling member being inserted into one said box member slanted open end, the other said end of each said coupling member being inserted into the other said box member slanted open end, said open slanted ends of said box members being in abutment, said flanges of said one box member being slidingly positioned in respective said grooves of said coupling members, said flanges of said other box member being slidingly positioned in other respective said grooves of said coupling members, each said coupling members having a pair of spaced openings therethrough, each said box member having a respective aperture through each of its said side walls adjacent its said slanted open end, one of said apertures of each said box member being in registry with a respective said opening of one said coupling member when said slanted open ends are in abutment with said one coupling member disposed in each of said open slanted ends, the other of said aperture of each said box member being in registry with respective said openings of the other said coupling member when said slanted open ends are in abutment with said other coupling member disposed in each of said open slanted ends, and connecting means extending through said registered apertures and openings for attaching each of said box members to each said coupling member.

5. A structural component comprising a rectilinear hollow box member having an elongated planar top wall and a bottom wall and a pair of side walls, a flange extending from one inner surface of one said side wall inwardly into its said hollow and spacedly below said top wall said flange and said top wall being adapted and arranged to receive therebetween an internal coupling member for connecting an identical structural member thereto, said top wall having an elongated channel socket extending below the upper surface thereof, said socket portion including a pair of spaced side walls extending downwardly from the top wall upper surface for connection with the bottom wall thereof, said socket portion having its said bottom wall extending outwardly beyond said side walls to form shoulders at each connection between said side walls and said bottom wall, said socket portion being adapted and arranged to receive therein a resilient member wherein said shoulders are effective to lockingly retain such member therein.

6. A structural component comprising a rectilinear hollow box member having an elongated planar top wall and an elongated bottom wall and a pair of side walls, an upper flange extending from one inner surface of one said side wall inwardly into its said hollow between said top and bottom wall, said bottom wall having an elongated slot therealong and forming a bottom flange extending from said one surface of said one side wall, said upper flange and said bottom flange being adapted and arranged to receive therebetween an internal coupling member for connecting an identical structural component thereto, said top wall having an elongated channel socket extending below the upper surface thereof, said socket portion including a pair of spaced side walls extending downwardly from the top wall upper surface for connection with the bottom wall thereof, said socket porton having its said bottom wall extending outwardly beyond said side walls to form shoulders at each connection between said side walls and said bottom wall, said socket portion being adapted and arranged to receive therein a connecting member wherein said shoulders are effective to lockingly retain such member therein.

7. A unitary structural component comprising a rectilinear member having an elongated base portion and an elongated upstanding wall portion, said wall portion having an elongated lower end connected along said base portion, said base portion having elongated side edges disposed on respective sides of said wall portion, a pair of pins in alignment with respective said elongated side edges and extending outwardly therefrom, an elongated top portion attached along the elongated upper end of said wall portion and including a pair of outwardly extending legs having upper inclined surfaces, the angle between the upper surfaces as measured inwardly of said member being other than 180°.

8. An elongated arcade frame comprising a plurality of rectilinear upstanding box shaped hollow post members respectively having an open upper end and a lower end, a plurality of arches having open free ends, coupling members fully inserted into respective said post member open ends and respective said arch open free ends thereby forming miter joints, said arches being spaced each from the next along a longitudinal axis of said frame, each said arch being formed of rectilinear hollow box members having open ends, other coupling members fully inserted into respective said open ends of adjacent said box members thereby forming miter joints therebetween, a plurality of elongated spacer members extending substantially parallel to said longitudinal axis, each said spacer member having one end connected to each box member forming one said miter joint of one said arch and its other end connected to each box member forming one said miter joint of another said arch.

9. An elongated tent frame comprising a plurality of rectilinear upstanding box shaped hollow post members respectively having an open upper end and a lower end, said post members being positioned remotely on opposite sides of the longitudinal axis of said frame and being spaced each from the next, a plurality of arches having open free ends, coupling members fully inserted into respective said post member open ends and respective said arch open free ends thereby forming miter joints, said arches being spaced each from the next along and spanning said longitudinal axis, each said arch being formed of rectilinear hollow box members having oppositely facing adjacent open ends, other coupling members fully inserted into respective said adjacent open ends thereby forming miter joints between adjacent box members, a plurality of elongated spacer members extending substantially parallel to said longitudinal axis, each said spacer member having one end connected to one said miter joint of one said arch and its other end connected to one said miter joint of an adjacent said arch, each said spacer member having a portion extending through each of said hollow members forming respective said miter joints and into respective said coupling members.

10. An elongated frame comprising two pairs of elongated upstanding hollow rectangular post members respectively having an outwardly disposed wall and an inwardly disposed wall, the upper end of each said post member being slanted and extending from its outwardly disposed wall to its inwardly disposed wall at a predetermined angle less than 90°, the lower end of each said post member being adapted and arranged to be supported on a foundation, each said pair of post members being positioned on either side of the longitudinal axis of the frame with their respective inwardly disposed walls in facing relation, one said pair of post members being spacedly aligned with the other said pair of post members along said axis, a pair of hollow arches each having an outwardly disposed surface and inwardly disposed surface and a pair of open ends, each said arch open end being slanted from its outwardly disposed surface to its inwardly disposed surface and adapted for mating abutment with respective said post member slanted upper end, each said arch including a plurality of elongated hollow box members each having a top wall and a bottom wall and slanted open ends extending from its top wall to its bottom wall at said predetermined angle, said box members being aligned end to end with adjacent ends being adapted for mating abutment, each said arch further including a plurality of internal coupling members each having a pair of legs extending outwardly at an included angle substantially twice said predetermined angle, each said coupling member having its legs fully inserted into a respective said adjacent slanted open ends of adjacent said box members, said top walls of said box members of each said arch constituting its continuous said outwardly disposed surface, two pairs of internal coupling members each having a pair of legs extending outwardly at said included angle, a respective said leg of said two pairs of internal coupling members being fully inserted into respective said slanted post member upper end and its other leg fully inserted into a respective said arch slanted open end, said outwardly disposed walls of each said pair of posts constituting extensions of respective said continuous outwardly disposed surface of respective said arches, a first plurality of spacer elements having opposite ends with adjacent ends extending through adjacent box members of one said arch for connecting same to its said coupling members, a second plurality of spacer elements having opposite ends with adjacent ends extending through said one pair of post members and said one arch open ends for connecting same to one said pair of coupling members, the other adjacent ends of said first plurality of spacer elements extending through adjacent box members of the other said arch for connecting same to its said coupling members, and the other adjacent ends of said second plurality of spacer elements extending through said pair of post members and said other arch open ends for connecting same to the other said pair of coupling members.

11. An elongated frame comprising two pairs of elongated upstanding hollow rectangular post members respectively having an outwardly disposed wall and an inwardly disposed wall, the upper end of each said post member being slanted and extending from its outwardly disposed wall to its inwardly disposed wall at a predetermined angle less than 90°, the lower end of each said post member being adapted and arranged to be supported on a foundation, each said pair of post members being positioned on either side of the longitudinal axis of the frame with their respective inwardly disposed walls in facing relations, one said pair of post members being spacedly aligned with the other said pair of post members along said axis, a pair of hollow arches each having an outwardly disposed surface and inwardly disposed surface and a pair of open ends, each said arch open end being slanted from its outwardly disposed surface to its inwardly disposed surface and adapted for mating abutment with respective said post member slanted upper end, each said arch including a plurality of elongated hollow box members each having a top wall and a bottom wall and slanted open ends extending from its top wall to its bottom wall at said predetermined angle, said box members being aligned end to end with adjacent ends being adapted for mating abutment, each said arch further including a plurality of internal coupling members each having a pair of legs extending outwardly at an included angle substantially twice said predetermined angle, each said coupling member having its legs fully inserted into a respective said adjacent slanted open ends of abutting adjacent said box members thereby forming miter joints, said top walls of said box members of each said arch constituting its continuous said outwardly disposed surface, two pairs of internal coupling members each having a pair of legs extending outwardly at said included angle, a respective said leg of said two pairs of internal coupling members being fully inserted into respective said slanted post member upper end and its other leg fully inserted into a respective said arch slanted open end thereby forming miter joints, said outwardly disposed walls of each said pair of posts constituting extensions of said continuous outwardly disposed surface of respective said arches, a plurality of elongated spacer members spanning between said arches, each said spacer member having one end connected to each said box member forming a respective said miter joint in one said arch and another end connected to an oppositely disposed respective miter joint in the other said arch.

12. An elongated frame comprising two pairs of elongated upstanding hollow rectangular post members respectively having an outwardly disposed wall and an inwardly disposed wall, the upper end of each said post member being slanted and extending from its outwardly disposed wall to its inwardly disposed wall at a predetermined angle less than 90°, the lower end of each said post member being adapted and arranged to be supported on a foundation, each said pair of post members being positioned on either side of the longitudinal axis of the frame with their respective inwardly disposed walls in facing relation, one said pair of post members being spacedly aligned with the other said pair of post members along said axis, a pair of hollow arches each having an outwardly disposed surface and inwardly disposed surface and a pair of open ends, each said arch open end being slanted from its outwardly disposed surface to its inwardly disposed surface and adapted for mating abutment with respective said post member slanted upper end, each said arch including a plurality of elongated hollow box members each having a top wall and a bottom wall and slanted open ends extending from its top wall to its bottom wall at said predetermined angle, said box members being aligned end to end with adjacent ends being adapted for mating abutment, each said arch further including a plurality of internal coupling members each having a pair of legs extending outwardly at an included angle substantially twice said predetermined angle, each said coupling member having its legs fully inserted into a respective said adjacent slanted open ends of abutting adjacent said box members thereby forming miter joints, said top walls of said box members of each said arch constituting its continuous said outwardly disposed surface, two pairs of internal coupling members each having a pair of legs extending outwardly at said included angle, a respective said leg of said two pairs of internal coupling members being fully inserted into respective said slanted post member upper end and its other leg fully inserted into a respective said arch slanted open end thereby forming miter joints, said outwardly disposed walls of each said pair of posts constituting extensions of said continuous outwardly disposed surface of respective said arches, a plurality of elongated spacer members spanning between said arches, each said spacer member having one end connected to a respective said miter joint in one said arch and another end connected to an oppositely disposed respective miter joint in the other said arch, each said spacer member having a top wall formed by two surfaces meeting at another included angle substantially equal to said included angle of said coupling members, said two surfaces of each said spacer member being substantially coplanar with said outwardly disposed surface of each said arch at said miter joints thereof.

13. An elongated frame and covering combination comprising two pairs of elongated upstanding hollow rectangular post members respectively having an outwardly disposed wall and an inwardly disposed wall, the upper end of each said post member being slanted and extending from its outwardly disposed wall to its inwardly disposed wall at a predetermined angle less than 90°, the lower end of each said post member being adapted and arranged to be supported on a foundation, each said pair of post members being positioned on either side of the longitudinal axis of the frame with their respective inwardly disposed walls in facing relation, one said pair of post members along said axis, a pair of hollow arches each having an outwardly disposed surface and inwardly disposed surface and a pair of open ends, each said arch open end being slanted from its outwardly disposed surface to its inwardly disposed surface and adapted for mating abutment with respective said post member slanted upper end, each said arch including a plurality of elongated hollow box members each having a top wall and a bottom wall and slanted open ends extending from its top wall to its bottom wall at said predetermined angle, said box members being aligned end to end with adjacent ends being adapted for mating abutment, each said arch further including a plurality of internal coupling members each having a pair of legs extending outwardly at an included angle substantially twice said predetermined angle, each said coupling member having its legs fully inserted into a respective said adjacent slanted open ends of adjacent said box members, said top walls of said box members of each said arch constituting its continuous said outwardly disposed surface, two pairs of internal coupling members each having a pair of legs extending outwardly at said included angle, a respective said leg of said two pairs of internal coupling members being fully inserted into respective said slanted post member upper end and its other leg fully inserted into a respective said arch slanted open end, said outwardly disposed walls of each said pair of posts constituting extensions of said continuous outwardly disposed surface of respective said arches, first means connecting said box members of one said arch to its said coupling members and connecting said one pair of post members and said one arch open ends to one said pair of coupling members, second means connecting said box members of the other said arch to its said coupling members and connecting said other pair of post members and said other arch open ends to the other said pair of coupling members, each said arch having an elongated outwardly opening continuous socket portion below its said outwardly disposed surface, a sheet material covering spanning between said arches and overlying each said socket portion, connecting means positioned over said covering and forcibly inserted into each said socket portion for releasably attaching said covering to each said arch.

References Cited by the Examiner

UNITED STATES PATENTS

| | | | |
|---|---|---|---|
| 1,817,162 | 8/1931 | Mulligan | 189—36 |
| 2,101,349 | 12/1937 | Sharp | 189—36 |
| 2,447,347 | 8/1948 | Krantz | 189—36 |
| 2,816,632 | 12/1957 | Nardulli | 189—36 |
| 2,827,138 | 3/1958 | Roy | 135—3 X |
| 2,858,774 | 11/1958 | Batten. | |
| 3,080,875 | 3/1963 | Bartlett | 135—3 X |
| 3,165,110 | 1/1965 | Brooks | 135—3 X |

FOREIGN PATENTS

| | | |
|---|---|---|
| 991,178 | 1/1951 | France. |

HARRISON R. MOSELEY, *Primary Examiner.*

L. J. SANTISI, *Assistant Examiner.*